United States Patent [19]

Rochester

[11] Patent Number: 4,958,899
[45] Date of Patent: Sep. 25, 1990

[54] ANNULAR OPTICAL FIBER SUPPORT WITH RADIAL GAS JETS

[75] Inventor: James R. Rochester, Tucson, Ariz.

[73] Assignee: Hughes Aircraft Company, Los Angeles, Calif.

[21] Appl. No.: 454,348

[22] Filed: Dec. 21, 1989

[51] Int. Cl.$^5$ .......................... G02B 6/26; G02B 6/00; B23Q 3/00; B23Q 3/08

[52] U.S. Cl. .............................. 350/96.20; 350/96.10; 269/20; 269/35; 269/287

[58] Field of Search .......................... 350/96.10, 96.20; 269/20, 35, 287

[56] References Cited

U.S. PATENT DOCUMENTS

| | | | |
|---|---|---|---|
| 3,436,071 | 4/1969 | Petruccelli | 269/20 |
| 4,607,485 | 8/1986 | Stahlecker | 57/401 |
| 4,796,970 | 1/1989 | Reeve et al. | 350/96.23 |
| 4,829,758 | 5/1989 | Gilhaus | 57/22 |
| 4,852,790 | 8/1989 | Karlinski | 228/148 |

*Primary Examiner*—John D. Lee
*Assistant Examiner*—Stephen Barns
*Attorney, Agent, or Firm*—R. A. Hays; R. M. Heald; W. Denson-Low

[57] ABSTRACT

A moving optical fiber (10) is guided in its motion by an annular guide apparatus (40) which receives the optical fiber (10) within an inner bore (66) and stabilizes its transverse position as it moves longitudinally. The guide (40) has a plurality of gas jets extending into the inner bore (66) that create a cushion of gas to maintain the position of the optical fiber (10) in the center of the bore (66), without the need for any physical contact between the bore (66) and the optical fiber (10). The annular guide (40) is preferably formed from a housing (42) that defines a gas plenum (74) and a flow control plate (52) that fits to the housing (42) and has circumferentially spaced, radially extending gas flow passages (54) etched therein. A gas flow introduced into the plenum (74) from an external source is distributed to the gas flow passages (54) and thence to the inner bore (66) to prevent the optical fiber (10) from physically contacting the guide (40).

17 Claims, 2 Drawing Sheets

ANNULAR OPTICAL FIBER SUPPORT WITH RADIAL GAS JETS

BACKGROUND OF THE INVENTION

This invention relates to an apparatus and process for handling optical fibers and, more particularly, to a noncontacting guide for moving optical fibers.

Optical fibers are strands of glass fiber processed so that light transmitted therethrough is subject to total internal reflection. A large fraction of the incident intensity of light directed into the fiber is received at the other end of the fiber, even though the fiber may be hundreds or thousands of meters long. Optical fibers have shown great promise in communications applications, because a high density of information may be carried along the fiber and because the quality of the signal is less subject to external interferences of various types than are electrical signals carried on metallic wires. Moreover, the glass fibers are light in weight and made from a highly plentiful substance, silicon dioxide.

Glass fibers are fabricated by preparing a preform of glasses of two different optical indices of refraction, one inside the other, and processing the perform to a fiber. The optical fiber is coated with a polymer layer termed a buffer to protect the glass from scratching or other damage. As an example of the dimensions, in a typical configuration the diameter of the glass optical fiber is about 125 micrometers, and the diameter of the fiber plus the polymer buffer is about 250 micrometers (approximately 0.010 inches).

The fibers may be wound onto a cylindrical or tapered cylindrical bobbin with many turns adjacent to each other in a side by side fashion. After one layer is complete, another layer of fiber is laid on top of the first layer, and so on. The final assembly of the bobbin and the wound layers of optical fiber is termed a canister, and the mass of wound optical fiber is termed the fiber pack. When the optical fiber is later to be used, the optical fiber is paid out from the canister in a direction generally parallel to the axis of the cylinder.

The optical fiber that is recived from the manufacturer on a spool is carefully wound onto the bobbin during canister fabrication. Other processing of the optical fiber prior to its being wound onto the bobbin, for example various types of inspection, requires that the optical fiber be transferred from one spool to another spool. Thus, a good deal of handling of the optical fiber is often required. One key aspect of the handling is the guiding of the optical fiber from place to place in a manner that the optical fiber is stabilized against transverse motion, such as transverse vibrations that may develop when the optical fiber is transferred at a high linear rate of movement.

For such very fine optical fibers, the handling of the optical fiber to avoid damage that might introduce winding anomalies as the optical fiber is wound onto the bobbin or reduce its light transmission properties becomes an important consideration. Scratches, nicks, or adherent material on the buffer layer can cause irregularities during the precision winding of the optical fiber onto the bobbin, which then can lead to failure during high-speed payout. Damage to the buffer layer can cause surface damage to the glass, thereby lowering the tensile strength of the optical fiber. This produces an increased likelihood of failure of the optical fiber either before or during payout. Damage to the buffer layer or the glass light conductor can also reduce the fraction of light that is transmitted, and even slight reductions can be a serious concern if there are a number of such damaged places along the length of the optical fiber.

The presently utilized approach for guiding optical fibers and stabilizing them against transverse motion during linear movement is a mechanical pulley. The pulley is a wheel rotatably supported on a transverse shaft and having a flat or grooved rim against which the optical fiber bears. As the optical fiber is moved longitudinally, its movement is guided by passage over the pulley. The mechanical contact of the optical fiber to the pulley rim also damps transverse motion such as vibration.

Although the approach of using pulleys to guide strands of material as they move is well established, in the case of pulleys used with optical fibers there is a substantial risk that the mechanical contact between the pulley rim and the optical fiber buffer may induce damage in the optical fiber. Moreover, dirt and other foreign matter may accumulate in the grooved rim of the pulley. The dirt and foreign matter may either abrade the buffer surface at the point of contact with the pulley, or may be forced into the surface of the buffer layer at some location along the length of the optical fiber. The resulting irregularity may then interfere with the winding of the optical fiber onto the bobbin or result in irregular payout of the optical fiber from the canister at a later time. The irregularity can also be the source of a failure during service. Pulleys have the further disadvantage that the shaft bearings can become worn or dirty, increasing the drag on the optical fiber. The drag on the fiber increases the chance of mechanical damage to the buffer layer. If the drag is increased to a sufficiently large value, the optical fiber may break during transfer.

There is therefore a need for an improved system for guiding and stabilizing the motion of optical fibers as they are moved longitudinally. Such a system should be readily adaptable to a range of applications, and desirably is relatively inexpensive to implement. The present invention fulfills this need, and further provides related advantages.

SUMMARY OF THE INVENTION

The present invention provides an apparatus and method for guiding and stabilizing the motion of an optical fiber. There is no physical contact between the optical fiber and the guide apparatus, avoiding mechanical damage to the optical fiber. Dirt and adhesive are not transferred from the optical fiber to the guide, or from the guide to the optical fiber. The apparatus can be used in a variety of situations, has no moving parts, and requires little attention once installed.

In accordance with the invention, a process for guiding an optical fiber comprises the steps of passing an optical fiber through an annular guide; and directing a sufficient flow of air against the optical fiber to stabilize the position of the optical fiber within the annular guide.

In one form of apparatus according to the invention, apparatus for stabilizing the position of an optical fiber comprises housing means for receiving the optical fiber, the housing means including a bore therethrough having a size greater than the size of the optical fiber; and means for directing a flow of gas against the surface of the optical fiber, when the optical fiber is within the bore of the housing means, to maintain the optical fiber centered within the bore. The gas flow is preferably directed against the optical fiber from a plurality of directions around its circumference through circumferentially spaced apart, generally radial gas flow passages that conduct gas to a plurality of openings in the walls of the bore. If the optical fiber moves transversely so as to produce greater impedance to the flow of air from one or more of the openings in the walls of the bore, the gas pressure against the fiber increases to exert a stabilizing force that pushes the optical fiber back toward the center of the bore. The stabilizing force is distributed over the surface of the optical fiber, and does not unduly stress any particular locations.

The approach of the present invention provides a gas cushion that prevents the optical fiber from moving from side to side, without any mechanical contact to the optical fiber. The bore in the housing of the preferred apparatus defines the size of the gas cushion and limits its radial and longitudinal extent, so that the apparatus may be operated with a modest pressure and flow rate of gas. Filtered air is normally used as the gas of the air cushion, but other gases may be substituted.

The approach of the invention provides an important advance in the handling of optical fibers. The optical fiber is guided and stabilized during transfer operations requiring longitudinal movement of the optical fiber, without any possibility of damage to the optical fiber. Other features and advantages of the invention will be apparent from the following more detailed description of the preferred embodiment, taken in conjunction with the accompanying drawings, which illustrate, by way of example, the principles of the invention.

DETAILED DESCRIPTION OF THE INVENTION

In accordance with the invention, apparatus for guiding a cylindrical optical fiber having a fiber diameter comprises an annular guide having a cylindrical bore therethrough and a plurality of circumferentially spaced apart gas flow passages extending through the guide to the surface of the bore, the diameter of the bore being greater than the diameter of the optical fiber by an amount such that the optical fiber may be supported by the gas flow through the gas flow passages. Preferably, the guide includes a housing having a gas plenum and an external gas connector in communication with the gas plenum, and a plate having the cylindrical inner surface and the plurality of gas flow passages formed therein, the plate being joined to the housing such that the gas flow passages of the plate communicate with the gas plenum of the housing.

Figure 1:
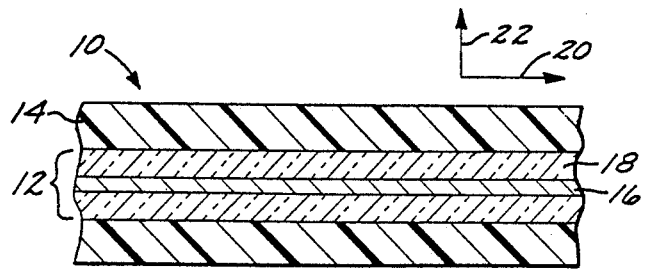
FIG. 1 is a side sectional view of an optical fiber.

As shown in FIG. 1, an optical fiber 10 includes a glass light conductor 12 and an overlying buffer layer 14. The light conductor 12 has a core 16 and a casing 18, both of which are made of glass. The buffer layer 14 is made of a polymer material such as a ultraviolet-light (UV) curable acrylate that is coated over the conductor 12 to protect it from physical damage. A longitudinal direction 20 parallel to the long dimension or cylindrical axis of the optical fiber 10 and a transverse direction 22 perpendicular to the long dimension of the optical fiber 10 (or, stated alternatively, parallel to a diameter of the optical fiber) may be defined. By way of example and not limitation, the diameter of the light conductor 12 is typically about 125 micrometers, and the overall outside diamter of the optical fiber 10 is typically about 250 micrometers.

Even with the presence of the buffer layer 14, external mechanical contacts to the optical fiber 10 may damage either the buffer layer or the light conductor itself. In conventional practice for handling optical fiber, as, for example, unwinding the optical fiber from a spool and then winding it onto a bobbin, the optical fiber passes over one or more pulleys that mechanically contact the surface of the optical fiber. Such mechanical contact can damage the optical fiber or force dirt or other foreign matter into its surface.

Figure 2:
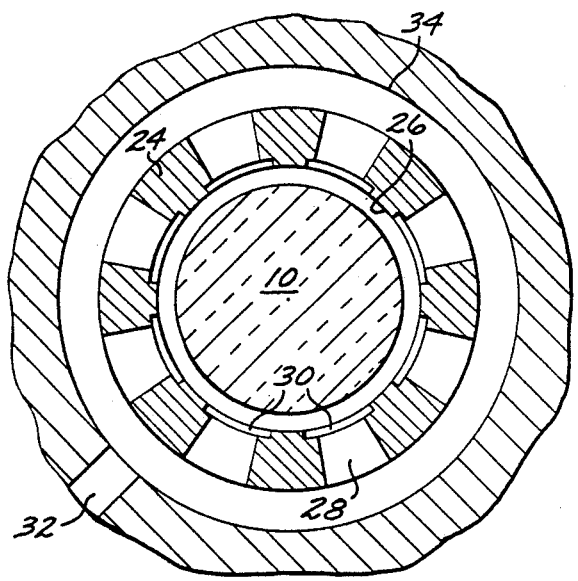
FIG. 2 is a transverse sectional view of an optical fiber guide with an optical fiber centered therein.

The approach of the present invention utilizes a gas cushion to guide and stabilize the optical fiber, in a manner such that there is no mechanical contacting of the optical fiber. FIG. 2 illustrates the basis of the present approach. A body 24 has a bore 26 therethrough. The diameter of the bore 26 is greater than the diameter of the optical fiber 10 that is to be guided, by an amount such that the gas cushion may be formed.

The body 24 has a plurality of gas passages 28 therein, each of the gas passages 28 including an exit opening 30 communicating with the interior of the bore 26 through the wall of the bore 26, and a supply line 32 and plenum 34 that together conduct a flow of gas to the gas passages 28. The gas flow passages 28 are disposed circumferentially around the circumference of the bore 26, so that, collectively, the passages 28 introduce gas flow into the bore 26 around the entire periphery of the bore 26.

Figure 3:
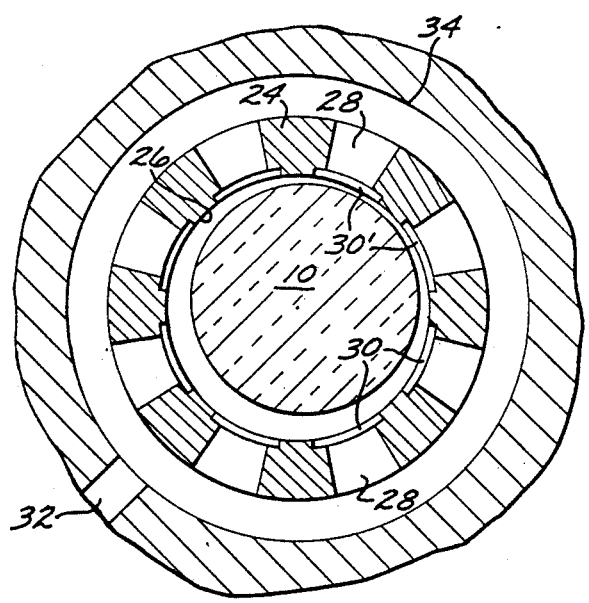
FIG. 3 is a transverse sectional view of an optical fiber guide similar to that of FIG. 2, except with the optical fiber displaced from the center of the guide during transverse instability.

The flow of gas through the gas flow passages 28 creates a flowing cushion of radially inwardly flowing air with a pressure distribution that tends to hold the optical fiber 10 in place, centered within the bore 26 in the manner illustrated in FIG. 2. The optical fiber 10 may sometimes move in the transverse direction 22 toward the wall of the bore 26, as shown in FIG. 3, due to external forces, transverse vibrations of the optical fiber, or other reasons. In that event, the force exerted by the gas flow from the exit openings 30' toward which the optical fiber has moved is increased, creating a restoring force that moves the optical fiber 10 in the opposite direction back toward the center of the bore 26 and the concentrically positioned configuration illustrated in FIG. 2.

Figure 4:
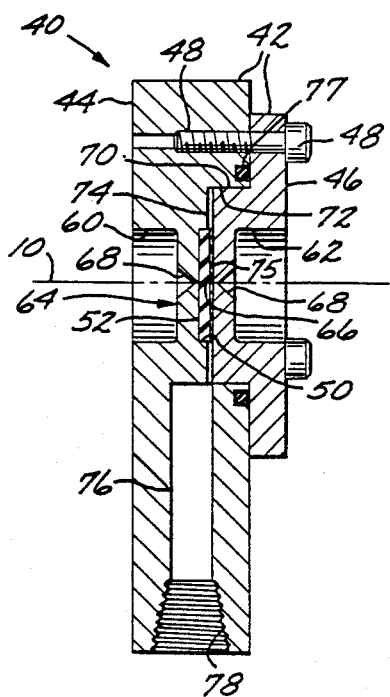
FIG. 4 is a side sectional view of a preferred guide of the invention.
Figure 5:
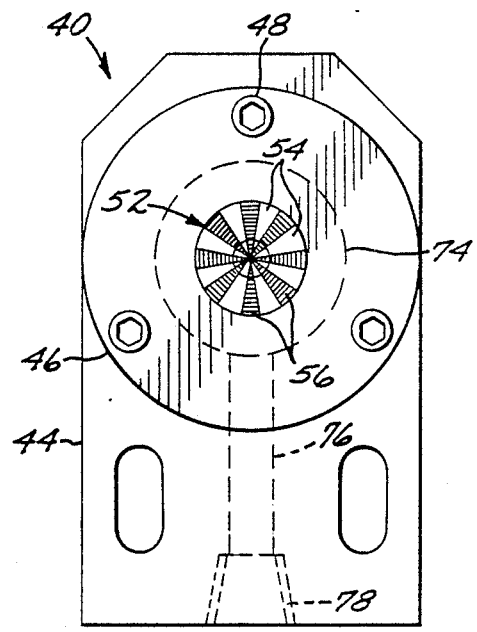
FIG. 5 is a top plan view of the guide of FIG. 4, with interior passageways illustrated in phantom lines.

A preferred construction of an apparatus 40 that makes use of this principle of operation is illustrated in side sectional view in FIG. 4 and in top plan view in FIG. 5. (The optical fiber 10 is shown in relation to the apparatus 40 in FIG. 4, for the normal operating position.) The apparatus 40 includes a housing 42 formed with two sections, a housing base 44 and a housing plate retainer 46. The housing plate retainer 46 is removably joinable to the housing base 44 with threaded bolts 48.

The housing base 44 has a locating recess 50 in one face thereof. A flow control plate 52 is received in the locating recess 50. The flow control plate 52 has a thickness greater than the depth of the locating recess 50, so that it projects above the shoulder of the locating recess 50 when in place to form an annular gap 74. The housing plate retainer 44 is tightened against the flow control plate 52 by the tightening of the bolts 48, retaining the flow control plate 52 in place within the locating recess 50.

The structure of the flow control plate 52 is shown in FIG. 5. On one of the broad faces of the plate 52 are etched regions 54 separated by unetched regions 56. The etched regions 54 extend radially from the outer periphery of the flow control plate 52 toward the center and a bore 66 that will be discussed subsequently. The etched regions 54 communicate with the bore 66 to form gas passage exit openings like those described in relation to FIG. 2. In the preferred embodiment, the depth of the etched regions 54 is reduced in thickness as compared with the unetched regions by about 0.0003 to 0.001 inches, most preferably about 0.0005 inches. The facing surfaces of the housing plate retainer 46 are lapped flat to +/−0.0001 inch and polished to a surface smoothness of 0.00002 inch. The etched regions and the facing surfaces therefore form a plurality of well defined channels that extends radially inwardly. Alternatively, the etched regions can be formed by precision grinding, machining, or any other suitable process for forming precisely dimensioned shallow depressions in a surface.

The etched regions 54 serve as the gas flow passages. They conduct gas from the annular gap 74, which acts as the gas plenum, to the bore 66. The etched regions also act as flow constrictors because of their small size, thereby creating a pressure drop that is desirably the same in all channels around the circumference of the bore 66. It is this flow of gas that stabilizes the optical fiber 10 in the center of the bore 66, in the manner described in relation to FIGS. 2 and 3. Any change in the position of the optical fiber 10 in the transverse direction 22 causes a change in the pressure drop through the constriction which acts to re-center the optical fiber 10 in the bore 66.

It is desirable that the flow of gas through the etched regions 54 produce the same pressure state uniformly around the circumference of the bore 66, so that the optical fiber 10 is stabilized in the center of the bore 66. Because of the small dimensions and tolerances of the various surfaces, it is difficult to achieve the required precision solely by metalworking. It has been found useful to place a thin and deformable sheet 75, preferably made of plastic, between the plate 52 and the facing surface of the housing plate retainer 46. Under pressure, the plastic sheet 75 deforms into the etched regions 54 and reduces their dimension slightly. Asymmetrical tightening of the threaded bolts 48 has been found operable to trim and equalize the gas flows so as to achieve a uniform flow through asymmetrical compression of the plastic sheet 75.

The housing base 44 and the housing plate retainer 46 having opposing thinning recesses 60 and 62 therein, forming a region of reduced sectional thickness 64 therebetween. The bore 66 extends through a region of reduced sectional thickness 64 between recesses 60 and 62 in the housing 42. That is, the bore 66 extends through the housing base 44, the housing plate retainer 46, and the flow control plate 52. The ends 68 of the bore 66 are radially enlarged to prevent snagging of the optical fiber 10 and to permit it to be initially threaded through the apparatus 40. The diameter of the bore 66 is selected as slightly larger than the diameter of the optical fiber 10, to produce an arrangement such as shown in FIG. 2 when the optical fiber 10 is threaded through the bore 66. The bore 66 thus functions in the manner of the bore 26 of FIG. 2.

The housing base 44 has a shoulder 70 in the same face as the locating recess 50. The housing plate retainer 46 has a conforming shoulder 72 thereon, so that the housing plate retainer 46 is securely located in precisely the proper position in relation to the housing base 44. The locating of the flow control plate 52 in the housing base 44 similarly precisely positions the plate 52. The bore 66 through the housing base 44, the housing plate retainer 46, and the flow control plate 52 therefore maintain a precise alignment when the apparatus 40 is assembled.

The thickness of the flow control plate 52 is greater than the shoulder 50, leaving the annular gap 74 around the outside diameter of the flow control plate 52. The annular gap 74 extends around the periphery of the flow control plate 52, and communicates with the etched regions 54 thereof. The gap 74 therefore acts as a plenum for a gas flow to be distributed to the plurality of etched regions 54, which serve as gas flow passages to the bore 66.

An external connection gas line 76 is machined into the housing base 44, and is closed by the assembly of the housing plate retainer 46 to the base 44 and an O-ring seal 77. The gas line 76 communicates at one end with the gap 74, and at the other end has a connection port 78 to which a source of gas is connected. Thus, pressurized gas provided from an external source flows through the gas line 76, the annular gap 74 as plenum, the radial etched regions 54 as gas flow passages, and into the bore 66. The gas then flows out of the bore 66 through its ends 68 and to the atmosphere.

The gas flow functions in the manner described previously in relation to FIG. 2, to provide a centering gas cushion for the optical fiber 10. Thus, the optical fiber 10 can be moved longitudinally through the bore 66, and the air cushion within the bore guides and laterally stabilizes the optical fiber 10 without any mechanical contact to the optical fiber 10.

An apparatus 40 has been constructed and tested. The nominal diameter of the optical fiber 10 with which the apparatus 40 was used was 250 micrometers, and the diameter of the bore 66 was 305 micrometers. The port 78 was a ¼ inch pipe fitting. The operating gas was filtered air, at a pressure of 80 pounds per square inch, gauge (psig). The apparatus functioned well at high optical fiber transport speeds.

The stabilizer apparatus of the invention can be used singly, as at a single point where transverse vibrations are to be dampened out. The stabilizer apparatus can also be used in pairs or larger numbers to provide stabilization over a length of the optical fiber, thereby providing angular as well as transverse stabilization. In accordance with this aspect of the invention, a system for handling an optical fiber comprises at least two optical fiber guides, each guide having housing means for receiving an optical fiber, the housing means including a bore therethrough having a size greater than the size of the optical fiber, and means for directing a flow of gas against the surface of the optical fiber, when the optical fiber is within the bore of the housing means, to maintain the optical fiber centered within the bore; and a frame in which the two optical fiber guides are supported.

Figure 6:
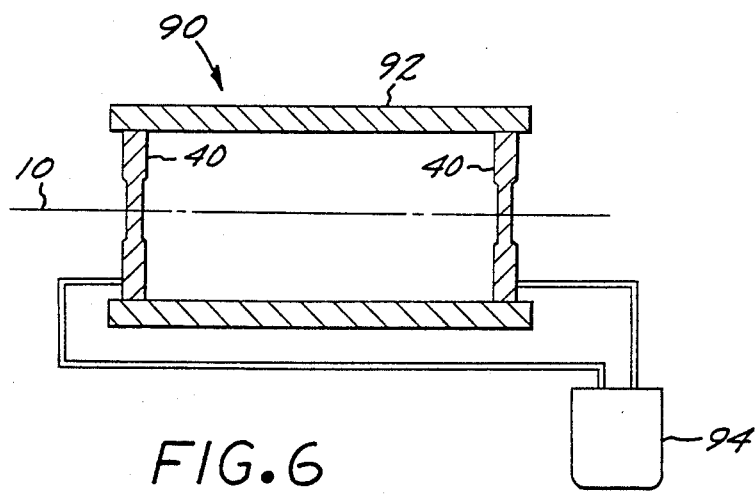
FIG. 6 is a side sectional view of a guide system utilizing at least two of the guides of FIG. 4.

An apparatus 90 as shown in FIG. 6 includes two (or more) units of the optical fiber guide stabilizer apparatus 40 mounted with their bores colinear, supported within a frame 92. A common gas supply 94 communicates with both of the units to provide the required gas pressure. The optical fiber 10 is passed through the apparatus 90, and in particular through the bores of the two apparatus 40. When the gas flow is started, the optical fiber 10 is maintained in the center of each of the bores in the manner described previously without physical contact, over the length between the apparatus 40. This arrangement can also be used with the bores of the apparatus 40 noncolinear so that the optical fiber 10 must gradually bend along its path through the apparatus 90, the result being a noncontacting bending of the optical fiber.

The apparatus and approach of the invention provide a guide and transverse stabilizer for optical fibers that functions without any mechanical contact to the optical fiber. It is operable at all optical fiber transport speeds, as there are no moving components whose performance is altered as the transport speed increases. Although particular embodiments of the invention have been described in detail for purposes of illustration, various modifications may be made without departing from the spirit and scope of the invention. Accordingly, the invention is not to be limited except as by the appended claims.

What is claimed is:

1. Apparatus for guiding a cylindrical optical fiber having a fiber diameter, comprising:
    an annular guide having a cylindrical inner bore therethrough and a plurality of circumferentially spaced apart gas flow passages extending through the guide to the surface of the bore, the diameter of the bore being greater than the diameter of the optical fiber by an amount such that the optical fiber may be supported by a gas flow through the gas flow passages.

2. The apparatus of claim 1, wherein the guide includes
    a housing having a gas plenum and an external gas connector in communication with the gas plenum; and
    a plate having the bore therethrough and the plurality of gas flow passages formed therein, the plate being joined to the housing such that the gas flow passages of the plate communicate with the gas plenum of the housing.

3. The apparatus of claim 2, wherein the gas flow passages are formed in the surface of the plate, and are closed by contact with a face of the housing.

4. The apparatus of claim 3, further including a deformable sheet between the plate and the face of the housing.

5. The apparatus of claim 2, wherein the gas flow passage are etched into the plate.

6. The apparatus of claim 2, wherein the gas flow passages are ground into the plate.

7. Apparatus for stabilizing the position of an optical fiber, comprising:
    housing means for receiving an optical fiber, the housing means including a bore therethrough having a size greater than the size of the optical fiber; and
    means for directing a flow of gas against the surface of the optical fiber, when the optical fiber is within the bore of the housing means, to maintain the optical fiber centered within the bore.

8. The apparatus of claim 7, wherein the means for directing includes a plurality of gas flow passages in the housing means, the gas flow passages communicating with the interior of the bore around the circumference of the bore.

9. The apparatus of claim 8, wherein the gas flow passages are formed as channels in a first plate closed with a flat face of a second plate.

10. Apparatus for stabilizing the position of an optical fiber, comprising:
    a housing base having an outwardly facing recess therein and a bore extending through the housing base from the bottom of the recess;
    a housing plate retainer having an outwardly facing recess therein and a bore extending through the housing base from the bottom of the recess, the housing plate retainer being removably attached to the housing base such that the bore of the housing base is aligned with the bore of the housing plate retainer;
    a flow control plate having a bore therethrough, the flow control plate being captured between the housing plate retainer and the housing base at a location such that the bore of the flow control plate is aligned with the bore of the housing base and the bore of the housing plate retainer to form a bore through the entire apparatus, the thickness of the flow control plate being selected such that a portion of the housing plate retainer is spaced apart from the facing portion of the housing base to form an annular plenum around the flow control plate, the flow control plate further having a plurality of etched gas passages therein extending radially from the annular plenum to the bore; and
    means for providing a flow of gas to the annular plenum.

11. The apparatus of claim 10, further including a deformable sheet between the housing plate retainer and the flow control plate.

12. A system for handling an optical fiber, comprising:
    at least two optical fiber guides, each guide including housing means for receiving the optical fiber, the housing means including a bore therethrough having a size greater than the size of the optical fiber, and
    means for directing a flow of gas against the surface of the optical fiber, when the optical fiber is within the bore of the housing means, to maintain the optical fiber centered within the bore; and
    a frame in which the two optical fiber guides are supported.

13. A process for guiding an optical fiber, comprising the steps of:
    passing an optical fiber through an annular guide; and
    directing a sufficient flow of air against the optical fiber to stabilize the position of the optical fiber within the annular guide.

14. The process of claim 13, wherein the annular guide includes
    a housing having a gas plenum and an external gas connector in communication with the gas plenum; and a plate having a cylindrical inner surface and a plurality of gas flow passages formed therein, the plate being joined to the housing such that the gas flow passages of the plate communicate with the gas plenum of the housing.

15. The process of claim 13, wherein the gas flow passages are formed in the surface of the plate, and are closed by contact with a face of the housing.

16. The process of claim 15, wherein a deformable sheet is placed between the plate and the face of the housing, so that the flow of air through the flow passages can be adjusted by deforming the sheet.

17. The process of claim 13, wherein the gas flow passages are etched into the plate.

* * * * *